H. A. DAVIS

Feb. 4, 1930. SELVAGE TRIMMING MECHANISM Re. 17,582

Original Filed April 26, 1928

Inventor.
Harry A. Davis
by Heard Smith & Tennant.
Attys

Reissued Feb. 4, 1930

Re. 17,582

UNITED STATES PATENT OFFICE

HARRY A. DAVIS, OF HOPEDALE, MASSACHUSETTS, ASSIGNOR TO DRAPER CORPORATION, OF HOPEDALE, MASSACHUSETTS, A CORPORATION OF MAINE

SELVAGE-TRIMMING MECHANISM

Original No. 1,697,812, dated January 1, 1929, Serial No. 272,911, filed April 26, 1928. Application for reissue filed November 21, 1929. Serial No. 408,908.

This invention relates to mechanism for trimming projecting filling ends from the selvage of cloth during the weaving operation.

It is the object of the invention to provide a selvage trimming mechanism which shall have its field of action close to the selvage.

It is the object of the invention to provide such a mechanism which may be supported by the usual temple.

It is the object of the invention to provide such a mechanism so arranged that it may be laterally positioned on and with respect to, its support, such, for example, as the temple, to maintain its field of action close to the selvage.

It is the object of the invention to provide such a mechanism in which the cutting elements shall be yieldingly maintained against the selvage so as to insure severing the ends close to the selvage under all conditions.

The object of the invention is to provide a support for the cutting mechanism which shall be self-adjustable with respect to the plane of the cloth and the selvage so as to position the field of action of the cutting mechanism close to the edge and thus insure the severance close to the edge of any filling ends extending therefrom.

These and other objects and features of the invention will appear more fully from the accompanying description and drawings and will be particularly defined by the claims.

The cutting mechanism with which the invention is concerned may be carried by any suitable support but is here shown as conveniently carried by the shank of a thread cutting temple. As the construction and operation of the temple are well known and familiar to those skilled in the art, and as the invention is not concerned with other features of the loom construction, it is sufficient in connection with the disclosure of a preferred form of the invention simply to illustrate a temple and a portion of the cloth being woven.

Figure 1:
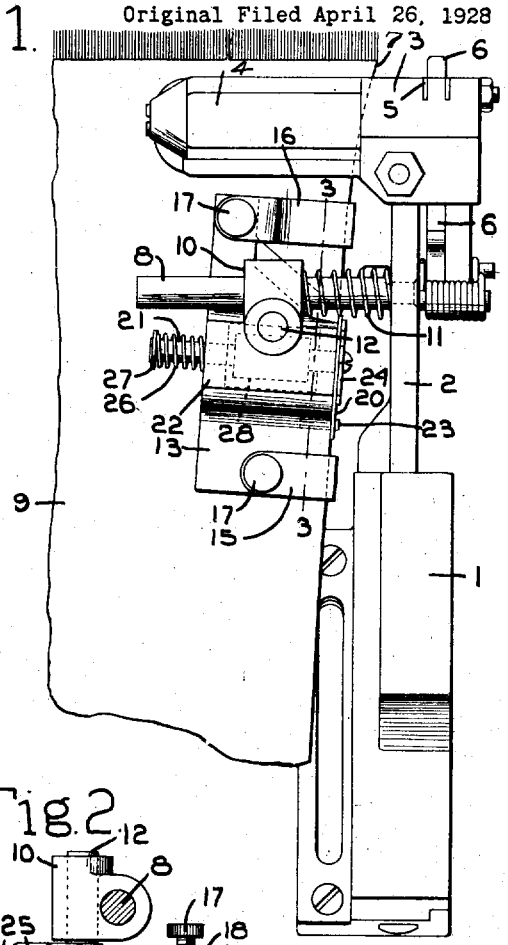
Fig. 1 is a top plan view of a preferred construction of the invention and the parts with which it is immediately associated.
Figure 2:
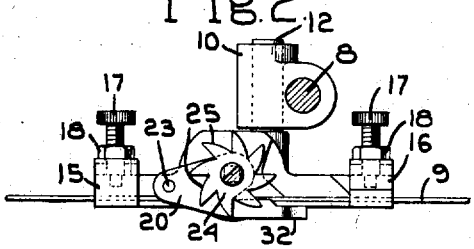
Fig. 2 is a side elevation of the construction of the invention shown in Fig. 1 with the supporting rod shown in cross section.
Figure 3:
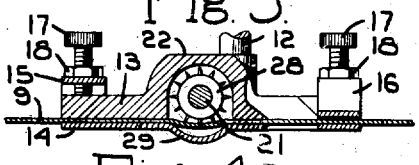
Fig. 3 is a view in cross section taken on the line 3—3 of Fig. 1.
Figure 4:
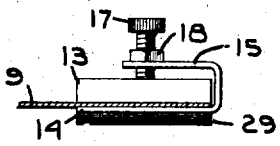
Fig. 4 is an elevation looking at the forward end of the construction.
Figure 5:
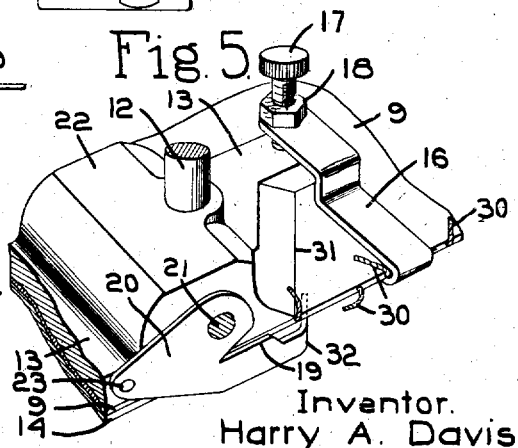
Fig. 5 is a detail in perspective to show particularly the guiding edges which divert the filling ends into the field of action of the cutting mechanism.

During the operation of weaving cloth, filling ends are constantly being left projecting along the selvage, particularly in the case of the automatic filling replenishing looms wherein upon each change of filling carrier two ends are left projecting. Even the cutting mechanism associated with the temple fails to sever all of these ends and seldom severs any of the ends sufficiently close to the selvage. As a result, it is necessary during the finishing operations on the cloth to remove the filling ends at the selvage by various means. The present invention provides a mechanism for trimming off all of the filling ends left projecting from the selvage close to the selvage so that no further removal of such filling ends is required in the finishing of the cloth. The mechanism of this invention may be employed by itself, but it is desirably associated with the usual thread cutting temple and acts upon the filling ends after they have passed through the temple. When so associated, or when a non-thread cutting temple is employed, the temple shank itself forms a convenient support for the cutting mechanism of this invention.

In the construction illustrated, the temple stand 1 is supported as usual from the breast beam or other portion of the loom frame and extends rearwardly. In this stand is mounted the shank 2 which carries at its rear end the temple head 3 having the laterally projecting portion 4 in which is journalled the usual pin roll. The temple shank and head have a reciprocatory movement in the stand, being moved forwardly at each beat-up by the lay of the loom coming in contact with a heel depending from the temple shank and head and being moved rearwardly by the usual spring contained in the stand 1. This temple is shown as provided with a familiar type of filling cutting mechanism comprising a fixed cutter blade 5 and a movable cutter blade 6 actuated at each beat-up of the lay and thus severing the filling ends brought within its field of action, particularly the filling ends extending from the selvage to a filling carrier discharged from the loom upon replenishment taking place. It will be noted that there is always a substantial distance between the selvage 7 of the cloth and the point where the filling end is cut by such device as the cutter blades 5 and 6 because the selvage cannot extend to the very end of the pin roll of the temple and this cutting mechanism is located beyond the end of the pin roll. Thus even filling ends severed by the usual temple thread cutting mechanism are still left projecting from the selvage to a substantial length. The mechanism of this invention removes such ends and any and all filling ends left projecting from the selvage by a cutting operation which takes place close to the selvage.

In a simple and preferred construction of the invention illustrated, the shank 2 of the temple is conveniently utilized as the main support. A rod 8 is rigidly secured in and extends laterally from the shank 2 above the plane of the cloth 9. A bracket 10 is mounted on this rod to slide thereon and preferably to rotate thereon. This bracket is yieldingly slid away from the support toward the cloth by a helical spring 11 surrounding the rod 8 between the bracket and the shank 2. The bracket 10 presents a vertical bore in which is mounted a stud 12, the stud being capable of rotary movement in the bracket and preferably also of vertical movement.

The stud extends from the base which supports and positions the cutting mechanism of this invention. The characteristic of the base is that it is positioned both by the plane of the cloth and the edge of the cloth so as under all conditions to maintain the field of action of the cutting mechanism close to the edge. The base therefore presents a surface resting upon and engaging at least one surface of the cloth and edge guiding surfaces engaging the edge of the cloth. In the construction illustrated, the base presents two substantially flat parallel plates between which the cloth passes and two edge guiding surfaces on one of these plates held against the edge of the cloth, while the cutting mechanism is located between these edge guiding surfaces and therefore positioned close to the edge. The upper plate 13 of the base is of a generally rectangular shape with its bottom surface adapted to rest on top of the cloth. This plate is of sufficient thickness to give it rigidity and is rigidly secured to the stud 12. The lower plate 14 of the base may be relatively thin and of the general shape of the upper plate and is adapted to rest against or closely adjacent to the lower surface of the cloth. This lower plate is shown as provided with the edge guiding surfaces. For this purpose the plate at the front and rear ends is shown as provided with narrow integral tongues projecting up to form edge guides and back over the plate 13 to enable a supporting connection to be made for the plate 14 from the plate 13. These tongues 15 and 16 have threaded into their free ends set screws 17 seated in the plate 13 and are provided with lock nuts 18. By adjusting these set screws, the space between the plates 13 and 14 may be varied in accordance with the thickness of the cloth and to adjust the friction between the base and the cloth.

The cutting mechanism, so far as the broader aspects of the invention are concerned, may be of various forms, but is here shown as comprising a fixed cutter blade standing close to the edge of the cloth and normal to the plane of the cloth and a rotary cutter cooperating therewith. In other words, the cooperating cutter blades operate in a plane substantially normal to the path of the cloth and substantially parallel to the selvage forward of the fell. The fixed blade 19 forms a portion of a plate 20 held in place by fitting over a shaft 21 journalled in a casing 22 forming an upstanding part of the plate 13 and also fitting over a stud 23 on the side of the plate. The cooperating rotary cutter 24 is shown as of the star wheel type and is rigidily connected to the shaft 21. As this cutter is rotated, its curved cutting edges 25 will cooperate with the cutting blade 19 to shear the filling ends and as the cutting field or field of action of these cooperating blades is immediately at the selvage, it will be seen that the filling ends will be severed close to the selvage. The rotary cutter is held up against the fixed cutter blade to produce the desired shearing action by a helical spring 26 on the shaft 21 between the casing 22 and a washer 27 on the end of the shaft.

The required rotary movement of the cutter member to effect the cutting action is here shown as secured by the relative movement which takes place between the cloth as it advances through the loom and the base upon which the cutting mechanism is supported. This relative movement between the cloth and the base is further amplified by the relative movement between the shank 2 of the temple and the cloth which takes place due to the forward and rearward movement of the temple shank in the stand. A pin roll 28 similar to the usual temple roll is secured to the shaft 21 within the casing 22 so as to be in constant engagement with the cloth passing through the base and the lower plate 14 of the base is depressed at 29 beneath this pin roll so as to enable the pins to get a firm grip on the cloth. Thus it will be seen that, as the cloth moves forwardly through the base due either or both to the advancing movement of the cloth as it is woven and the rearward movement of the temple after it has been moved forwardly by the lay, the pin roll 28 will rotate the shaft 21 to bring one or more of the cutting edges 25 of the rotary cutter into cooperation with the fixed cutter blade 19 thus to sever any filling ends brought between them close to the selvage.

The filling ends which project from the selvage such as are shown at 30 are often comparatively short and curl up or lie against one of the surfaces of the cloth. It is important, therefore, to provide means for insuring that these ends shall be so positioned that they shall pass with certainty betwen the cutting blades. To secure this result the base is shown as provided with guides extending obliquely to the edge of the cloth and engaging respectively the upper and lower surfaces of the cloth and acting to divert these filling ends into the field of action of the cutting mechanism. The upper plate 13 is cut away at the rear or formed to present the oblique guiding edge 31 resting against the top surface of the cloth and thus serving to divert any filling ends extending over against the top surface of the cloth in between the cutter blades. The other guide is conveniently formed as an extension 32 from the fixed cutter plate 20. This extension 32 extends beneath the cloth against the lower surface and in an oblique direction substantially parallel with the guide 31. There is thus formed a lower oblique guide which acts to divert any filling ends curled or lying against the lower surface of the cloth into the field of action of the cutting mechanism.

The principle of operation of the preferred form of the invention will be apparent. The base which supports the cutting mechanism having a guiding surface engaging and conforming to the plane of the cloth and having edge guiding surfaces adapted to rest against the cloth is self-adjusting so as to position the cuttting mechanism close to the edge of the cloth. This self-adjustment is secured in the construction illustrated by the ability of the base to move bodily laterally of the shaft 8 and to rotate on the stud 12. Furthermore, as the plane of the cloth may, and usually does, vary with respect to the shaft 8, the base is preferably permitted to conform to any such variations by reason of the rotary movement permitted between the bracket 10 and the shaft 8 and the sliding movement permitted between the bracket 10 and the stud 12. The spring 11 constantly acts to hold the base with the edge guides against the edge of the cloth and with the various connections described make the base self-adjusting both to the plane and the direction of the edge of the cloth. Thus the filling ends diverted by the oblique guides pass successively into the field of action of the cutting mechanism and are uniformly severed close to the selvage.

Having thus described the invention, what is claimed as new, and desired to be secured by Letters Patent, is:

1. Selvage trimming mechanism for looms comprising a support mounted on the loom frame and extending adjacent the selvage forward of the fell, a base mounted on the support having guiding surfaces to engage the surface and the edge of the cloth and movable to conform to the plane of the cloth and to the direction of the edge of the cloth, means acting yieldingly to force the edge engaging surface of the base against the edge of the cloth cutting mechanism on the base positioned thereby to present its field of action close to the edge of the cloth and means for operating the cutting mechanism to sever close to the edge filling ends extending therefrom.

2. Selvage trimming mechanism for looms comprising a support mounted on the loom frame and extending adjacent the selvage forward of the fell, a base mounted on the support having guiding surfaces to engage the surface and the edge of the cloth and movable to conform to the plane of the cloth and to the direction of the edge of the cloth, means acting yieldingly to force the edge engaging surface of the base against the edge of the cloth, cutting mechanism on the base positioned thereby to present its field of action close to the edge of the cloth, a cloth engaging roll journalled in the base and rotated by the relative longitudinal movement between the cloth and the base and connections between the roll and cutting mechanism to actuate the latter upon the rotation of the former to sever close to the edge filling ends extending therefrom.

3. Selvage trimming mechanism for looms comprising a support mounted on the loom frame and extending adjacent the selvage forward of the fell, means for periodically reciprocating the support forward and rearward, a base mounted on the support having guiding surfaces to engage the surface and the edge of the cloth and movable to conform to the plane of the cloth and to the direction of the edge of the cloth, means acting yieldingly to force the edge engaging surface of the base against the edge of the cloth, cutting mechanism on the base positioned thereby to present its field of action close to the edge of the cloth and means actuated by the relative longitudinal movement between the cloth and the support to operate the cutting mechanism to sever close to the edge filling ends extending therefrom.

4. Selvage trimming mechanism for looms comprising a support mounted on the loom frame and extending adjacent the selvage forward of the fell, a base mounted on the support having guiding surfaces to engage the surface and the edge of the cloth and movable to conform to the plane of the cloth and to the direction of the edge of the cloth, yielding means between the support and the base acting to force the edge engaging surface of the base against the edge of the cloth, cutting mechanism on the base positioned thereby to present its field of action close to the edge of the cloth and means for operating the cutting mechanism to sever close to the edge filling ends extending therefrom.

5. Selvage trimming mechanism for looms comprising a support mounted on the loom frame and extending adjacent the selvage forward of the fell, a base mounted on the support having guiding surfaces to engage the surface and the edge of the cloth and movable to conform to the plane of the cloth and to the direction of the edge of the cloth, cutting mechanism on the base positioned thereby to present its field of action close to the edge of the cloth and means for operating the cutting mechanism to sever close to the edge filling ends extending therefrom.

6. Selvage trimming mechanism for looms comprising the construction defined in claim 5, together with guides on the base extending obliquely to the edge of the cloth and engaging respectively the upper and lower surfaces of the cloth and acting to divert filling ends extending from the edge of the cloth into the field of action of the cutting mechanism.

7. Selvage trimming mechanism for looms comprising a base having guiding surfaces to engage the surfaces and the edge of the cloth and self-adjustable with respect to the cloth to conform to the plane and adjacent edge of the cloth, cutting mechanism on the base positioned thereby to present its field of action close to the edge of the cloth and means for operating the cutting mechanism to sever close to the edge filling ends extending therefrom.

8. Selvage trimming mechanism for looms comprising a base having guiding surfaces to engage the surfaces and the edge of the cloth and self-adjustable with respect to the cloth to conform to the plane and adjacent edge of the cloth, cutting mechanism on the base positioned thereby to present its field of action close to the edge of the cloth, a cloth engaging roll journalled in the base and rotated by the relative longitudinal movement between the cloth and the base and connections between the roll and cutting mechanism to actuate the latter upon the rotation of the former to sever close to the edge filling ends extending therefrom.

9. Selvage trimming mechanism for looms comprising a support mounted on the loom frame and extending adjacent the selvage forward of the fell, a base mounted on the support and self-adjustable with respect thereto to conform to the plane and adjacent edge of the cloth, cutting mechanism on the base positioned thereby to present its field of action close to the edge of the cloth and means for operating the cutting mechanism to sever close to the edge filling ends extending therefrom.

10. Selvage trimming mechanism for looms comprising the construction defined in claim 9, together with guides on the base extending obliquely to the edge of the cloth and engaging respectively the upper and lower surfaces of the cloth and acting to divert filling ends extending from the edge of the cloth into the field of action of the cutting mechanism.

11. Selvage trimming mechanism for looms comprising a support mounted on the loom frame and extending adjacent the selvage forward of the fell, a base mounted on the support and self-adjustable with respect thereto to conform to the plane and adjacent edge of the cloth cutting mechanism on the base positioned thereby to present its field of action close to the edge of the cloth, means for periodically reciprocating the support forward and rearward, a cloth engaging roll journalled in the base and rotated by the relative longitudinal movement between the cloth and the support and connections between the roll and cutting mechanism to actuate the latter upon the rotation of the former to sever close to the edge filling ends extending therefrom.

12. Selvage trimming mchanism for looms comprising a support mounted on the loom frame and extending adjacent the selvage forward of the fell, a rod extending laterally from the support, a bracket mounted to slide on the rod, means for yieldingly sliding the bracket on the rod away from the support toward the cloth, a base mounted on the bracket to rotate on an axis extending transversely of the rod, the said base resting on one surface of the cloth and positioned thereby in the plane of the cloth and having edge guiding surfaces engaging the edge of the cloth to position the base in conformity to the direction of the edge of the cloth, cutting mechanism on the base positioned thereby to present its field of action close to the edge of the cloth and means for operating the cutting mechanism to sever close to the edge filling ends extending therefrom.

13. Selvage trimming mechanism for looms comprising a support mounted on the loom frame and extending adjacent the selvage forward of the fell, a rod extending laterally from the support, a bracket mounted to rotate and slide on the rod, means for yieldingly sliding the bracket on rod away from the support toward the cloth, a base mounted on the bracket to rotate and slide on an axis extending transversely of the rod, the said base resting on one surface of the cloth and positioned thereby in the plane of the cloth and having edge guiding surfaces engaging the edge of the cloth to position the base in conformity to the direction of the edge of the cloth, cutting mechanism on the base positioned thereby to present its field of action close to the edge of the cloth and means for operating the cutting mechanism to sever close to the edge filling ends extending therefrom.

14. Selvage trimming mechanism for looms comprising a base presenting two parallel plates between which the cloth passes, guiding surfaces on the base engaging the edge of the cloth and positioning the base in line with the edge of the cloth, cutting mechanism on the base positioned thereby to present its field of action close to the edge of the cloth and means for operating the cutting mechanism to sever close to the edge filling ends extending therefrom.

15. Selvage trimming mechanism comprising the construction defined in claim 14, together with means for adjusting the plates toward and from each other to vary the space through which the cloth passes.

16. Selvage trimming mechanism for looms comprising the construction defined in claim 14, in which the cutting mechanism is mounted on the base between the edge guiding surfaces.

17. Selvage trimming mechanism for looms comprising the construction defined in claim 14, in which the cutting mechanism is mounted on the base between the edge guiding surfaces and in which the upper plate at the rear of the cutting mechanism is provided with a guide extending obliquely to the edge of the cloth and engaging the upper surface of the cloth and acting to divert filling ends extending up from the edge of the cloth into the field of action of the cutting mechanism.

18. Selvage trimming mechanism for looms comprising the construction defined in claim 14, in which the cutting mechanism is mounted on the base between the edge guiding surfaces and in which the base is provided with a guide extending beneath the cloth in the rear of the cutting mechanism obliquely to the edge of the cloth and in engagement with the lower surface thereof to divert filling ends projecting down from the edge of the cloth into the field of action of the cutting mechanism.

19. Selvage trimming mechanism for looms comprising a temple, a pair of cooperating cutter blades supported from the loom frame and located forward of the fell and operating in a plane substantially normal to the path of the cloth and substantially parallel to the selvage and mounted for joint bodily movement with respect to the temple toward and from the selvage whereby the blades may be positioned to sever close to the selvage filling ends extending therefrom, and means for effecting the cutting operation of the blades.

20. Selvage trimming means for looms comprising a support mounted on the loom frame and extending in the vicinity of the selvage forward of the fell, a pair of cooperating cutter blades operating in a plane substantially normal to the path of the cloth and substantially parallel to the selvage forward of the fell and mounted on the support for joint bodily movement with respect to the support toward and from the selvage, means for effecting the cutting operation of the blades, and means acting yieldingly to maintain the blades against the selvage whereby the blades are automatically positioned to sever close to the selvage filling ends extending therefrom.

21. Selvage trimming means for looms comprising a support mounted on the loom frame and extending in the vicinity of the selvage forward of the fell, a pair of cooperating cutter blades operating in a plane substantially normal to the path of the cloth and substantially parallel to the selvage forward of the fell and mounted on the support for joint bodily movement with respect to the support toward and from the selvage, means for effecting the cutting operation of the blades, means acting yieldingly to move the blades toward the selvage and means for limiting such movement.

22. Selvage trimming means for looms comprising a temple, a main cutter blade standing in a plane substantially normal to the path of the cloth and substantially parallel to the selvage forward of the fell and mounted from the loom frame for movement with respect to the temple toward and from the selvage, a cooperating movable cutter blade held yieldingly against the main cutter blade, means to position the main cutter blade close to the selvage and means for moving the movable cutter blade to cooperate with the fixed cutter blade to sever the filling ends close to the selvage.

23. Selvage trimming means for looms comprising a support mounted on the loom frame and extending in the vicinity of the selvage forward of the fell, a main cutter blade standing in a plane substantially normal to the path of the cloth and substantially parallel to the selvage forward of the fell and mounted on the support for movement toward and from the selvage, a cooperating movable cutter blade held yieldingly against the main cutter blade, means acting yieldingly to maintain the main cutter blade against the selvage and means for moving the movable cutter blade to cooperate with the fixed cutter blade to sever the filling ends close to the selvage, In testimony whereof, I have signed my name to this specification.

HARRY A. DAVIS.